US012647243B2

(12) United States Patent
van der Wilt et al.

(10) Patent No.: US 12,647,243 B2
(45) Date of Patent: Jun. 2, 2026

(54) VERY SHORT-RANGE HIGH-SPEED FULL-DUPLEX WIRELESS COMMUNICATIONS

(71) Applicant: NXP B.V., Eindhoven (NL)

(72) Inventors: Floris Pepijn van der Wilt, Leidschendam (NL); Koen van Hartingsveldt, Leiderdorp (NL); Johan Olink, Delfgauw (NL)

(73) Assignee: NXP B.V., Eindhoven (NL)

( * ) Notice: Subject to any disclaimer, the term of this patent is extended or adjusted under 35 U.S.C. 154(b) by 529 days.

(21) Appl. No.: 17/945,866

(22) Filed: Sep. 15, 2022

(65) Prior Publication Data

US 2024/0097868 A1 Mar. 21, 2024

(51) Int. Cl.
*H04L 5/14* (2006.01)
*H04B 1/38* (2015.01)

(52) U.S. Cl.
CPC .............. *H04L 5/143* (2013.01); *H04B 1/38* (2013.01)

(58) Field of Classification Search
CPC ......... H04L 5/143; H04L 5/1469; H04B 1/38; H04B 1/034; H04M 9/001
See application file for complete search history.

(56) References Cited

U.S. PATENT DOCUMENTS 11,081,798 B2 8/2021 Gurbuz et al.
2009/0295642 A1* 12/2009 Nilsson .................. H01Q 11/04
343/700 MS 2019/0173151 A1* 6/2019 Henry ...................... H04B 3/52
2019/0198999 A1* 6/2019 Ashrafi ................ H01Q 9/0428
2021/0104821 A1* 4/2021 Gurbuz ................ H01Q 13/106
2021/0351901 A1* 11/2021 Hassan ..................... H04L 5/06

FOREIGN PATENT DOCUMENTS

CN 109067426 B 6/2020

OTHER PUBLICATIONS

Dinc, Tolga et al. "A 60 GHz Same-Channel Full-Duplex CMOS Transceiver and Link Based on Reconfigurable Polarization-Based Antenna Cancellation", IEEE Radio Frequency Integrated Circuits Symposium, 2015, pp. 31-34.

(Continued)

*Primary Examiner* — Brian T Le

(57) ABSTRACT

A wireless communication system includes: a transceiver configured to modulate desired transmission data onto a band of frequencies, thereby generating a transmission signal, and to demodulate a reception signal within the same frequencies in order to obtain received data; and an antenna module that includes a first radiative element, coupled to the transceiver and configured to receive and broadcast the transmission signal, and a second radiative element, also coupled to the transceiver and configured to receive the reception signal, simultaneous with the broadcast of the transmission signal. The first radiative element and the second radiative element have a common centroid. The transceiver and the antenna module are part of a single wireless device that is configured for full-duplex wireless communication, at a data rate of at least 100 megabits per second (Mb/s) over a distance that is not more than 100 millimeters from the antenna module.

20 Claims, 12 Drawing Sheets

(56) References Cited

OTHER PUBLICATIONS

Borah, Dipangkar et al. "Design, fabrication and characterization of flexible and ultrathin microwave metamaterial absorber", IEEE, 2017, pp. 190-193.

Liao, Shaowei et al. "Dual Polarized Planar Aperture Antenna on LTCC for 60-GHz Antenna-in-Package Applications", IEEE Transactions on Antennas and Propagation, vol. 65, No. 1, Jan. 2017, pp. 63-70.

Chen, Zhijiao et al. "High Gain, Broadband and Dual-Polarized Substrate Integrated Waveguide Cavity-Backed Slot Antenna Array for 60 GHz Band", IEEE Access, vol. 6, Jun. 26, 2018, p. 31012-31022.

Etellisi, Ehab A. et al. "Wideband Monostatic Simultaneous Transmit and Receive (STAR) Antenna", IEEE Transactions on Antennas and Propagation, vol. 64, No. 1, Jan. 2016, pp. 6-15.

* cited by examiner

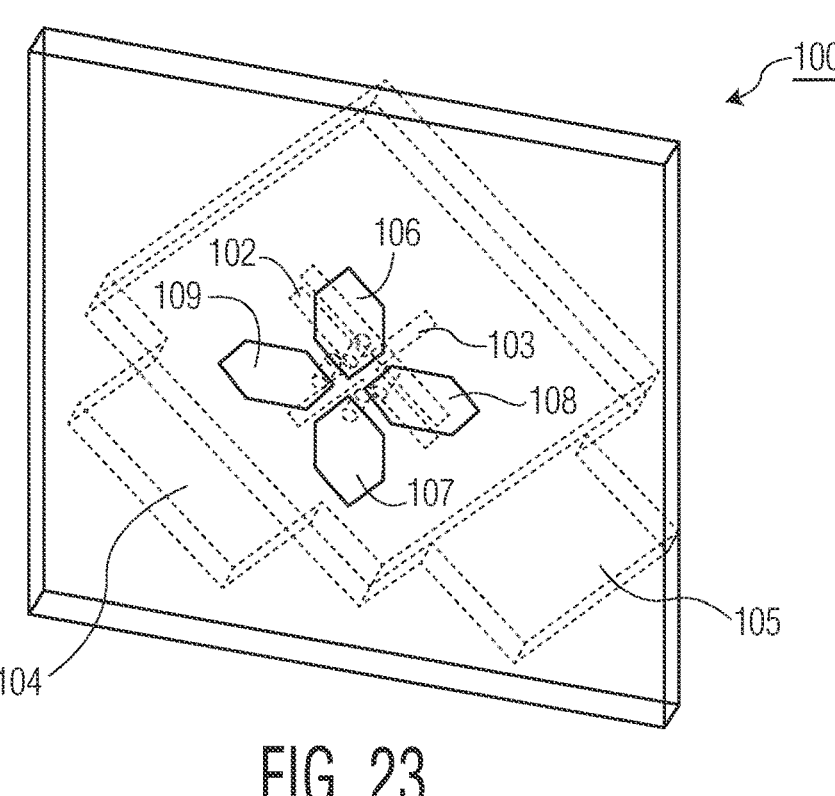
FIG. 23
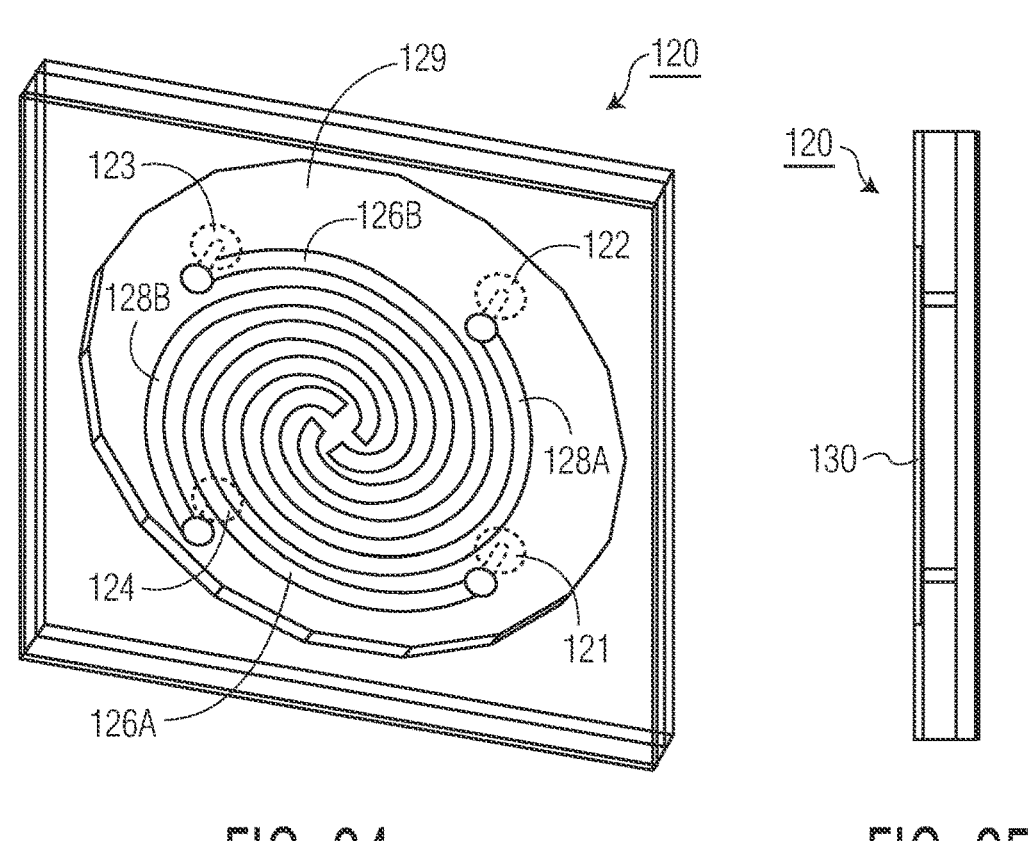
FIG. 24        FIG. 25

VERY SHORT-RANGE HIGH-SPEED FULL-DUPLEX WIRELESS COMMUNICATIONS

FIELD OF THE INVENTION

The present invention pertains, among other things, to systems, transceivers, antenna configurations, methods and techniques for very short-range full-duplex wireless communications, and is particularly applicable to such communications at high data rates.

BACKGROUND

The following discussion concerns certain background information related to the present invention, including discussion of some relevant prior art. In certain instances, the following discussion also provides the present inventors' (1) identification and analysis of some of the problems related to the present invention and/or (2) observations regarding and/or characterizations of the prior art. However, it should be understood that only knowledge clearly, explicitly and specifically described herein as being "conventional" or "prior art" is intended to be characterized as such. Everything else should be understood as knowledge and/or insight originating from the present inventors.

The design of a new communication system can be very challenging, requiring the designer(s) to simultaneously address a variety of different issues and problems, often issues and problems that are unique to the particular requirements of the desired system, with consideration of the attendant trade-offs that differing potential approaches present. Solutions that work well in one environment, for one set of requirements, and/or under one set of circumstances, often will be far from optimal in another environment or where different requirements are specified.

For example, with respect to wireless communication systems, nearly limitless combinations of different components, approaches and designs exist. Moreover, prior to even considering any potential designs, it can be quite difficult to even clearly identify all of the issues and problems implicated by a particular set of system requirements, environmental conditions and/or preferences. Only after identification and then a detailed analysis of all such potential issues and problems is it possible to even begin considering potential approaches to simultaneously address all of them.

Then, for example within the context of wireless communication systems, there are broad categories to consider, such as circuitry, enclosures, shielding, absorbers and other kinds of non-electronic hardware, component layout, processing algorithms, antenna design, frequency and bandwidth considerations, etc. Within these broad categories, an enormous variety of different possibilities exists, and the potential combinations of such different possibilities across all such categories are staggering. As a result, choosing the best components, structures, processing algorithms and overall system design for attaining desired system-performance capabilities, particularly when considering cost and/or space constraints, often can be formidable.

SUMMARY OF THE INVENTION

The present invention primarily concerns a particular type of communication system, i.e., very short-range full-duplex wireless communication systems, particularly those operating at high data rates.

One embodiment of the invention is directed to a wireless communication system that includes: a transceiver configured to modulate desired transmission data onto a band of frequencies, thereby generating a transmission signal, and to demodulate a reception signal within the same frequencies in order to obtain received data; and an antenna module that includes a first radiative element, coupled to the transceiver and configured to receive and broadcast the transmission signal, and a second radiative element, also coupled to the transceiver and configured to receive the reception signal, simultaneous with the broadcast of the transmission signal, from a source and provide such reception signal to the transceiver. The first radiative element and the second radiative element have a common centroid. The transceiver and the antenna module are part of a single wireless device that is configured for full-duplex wireless communication, at a data rate of at least 100 megabits per second (Mb/s) over a distance that is not more than 100 millimeters from the antenna module.

Certain more-specific implementations of either of the foregoing embodiments include one or more of the following features.

The maximum specified distance is not more than 25 mm.

The maximum specified distance is not more than 10 mm.

The data rate is at least 1 gigabits per second (Gb/s).

The band of frequencies is at least 2 GHz wide.

Relevant structure within the antenna module satisfies at least one of: Type 1 symmetry, pursuant to which there exists a plane of symmetry such that such relevant structure is congruent to a mirror image of such relevant structure that results when such relevant structure is mirrored with respect to such plane, or Type 2 symmetry, pursuant to which there exists an axis of symmetry such that such relevant structure is congruent to a rotated version of such relevant structure that results when such relevant structure is rotated around such axis by 180/n degrees, with n being an integer greater than 1, and such relevant structure includes the first radiative element and the second radiative element.

The relevant structure also includes each port that connects the first radiative element or the second radiative element to a waveguide between the antenna module and the transceiver.

The relevant structure of the antenna module has Type 1 symmetry.

The relevant structure of the antenna module has Type 2 symmetry.

The relevant structure of the antenna module has Type 1 symmetry, and there also exists a second plane of symmetry such that the relevant structure also is congruent to a second mirror image of the relevant structure that results when the relevant structure is mirrored with respect to such second plane.

At least one electromagnetic radiation absorber is disposed around and/or behind the antenna module to counteract near field and scattering effects, present due to very short link distances involved, that otherwise would degrade the Type 1 symmetry or Type 2 symmetry.

The transmission signal is provided at a power not greater than 20 decibel-milliwatts (dBm).

The first radiative element includes two distinct parts, connected to two distinct waveguides via two distinct sub-ports, and the second radiative element also includes two distinct parts, connected to two distinct waveguides via two distinct sub-ports.

The two distinct parts of the first radiative element and the two distinct parts of the second radiative element all spiral out from a common center point.

The system also includes a second wireless device, in full-duplex wireless communication with the single wireless device.

The second wireless device includes a second antenna module at a distance not greater than the maximum specified distance from the antenna module during the full-duplex wireless communication.

The first radiative element and the second radiative element are integrated into a single circular patch, and the single wireless device is configured for transmission and reception of orthogonal linearly polarized waves.

The antenna module has a maximum dimension of less than 50 mm.

The single wireless device also includes at least one electromagnetic radiation absorber disposed at least one of (1) around the antenna module or (2) between the antenna module and other portions of such single wireless device.

The single wireless device is a battery-powered handheld device.

The single wireless device is part of a larger externally powered system.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the accompanying drawings. However, it should be understood that the drawings merely depict certain concepts and/or certain representative and/or exemplary embodiments and features of the present invention and are not intended to limit the scope of the invention in any manner. The following is a brief description of each of the accompanying drawings.

FIG. 23 is a perspective view showing internal aspects of the slot-fed magneto-electrical dipole antenna module.

FIG. 24 is a perspective view of a spiral antenna module.

FIG. 25 is a side sectional view of the spiral antenna module.

DESCRIPTION OF THE PREFERRED EMBODIMENT(S)

Figure 1:
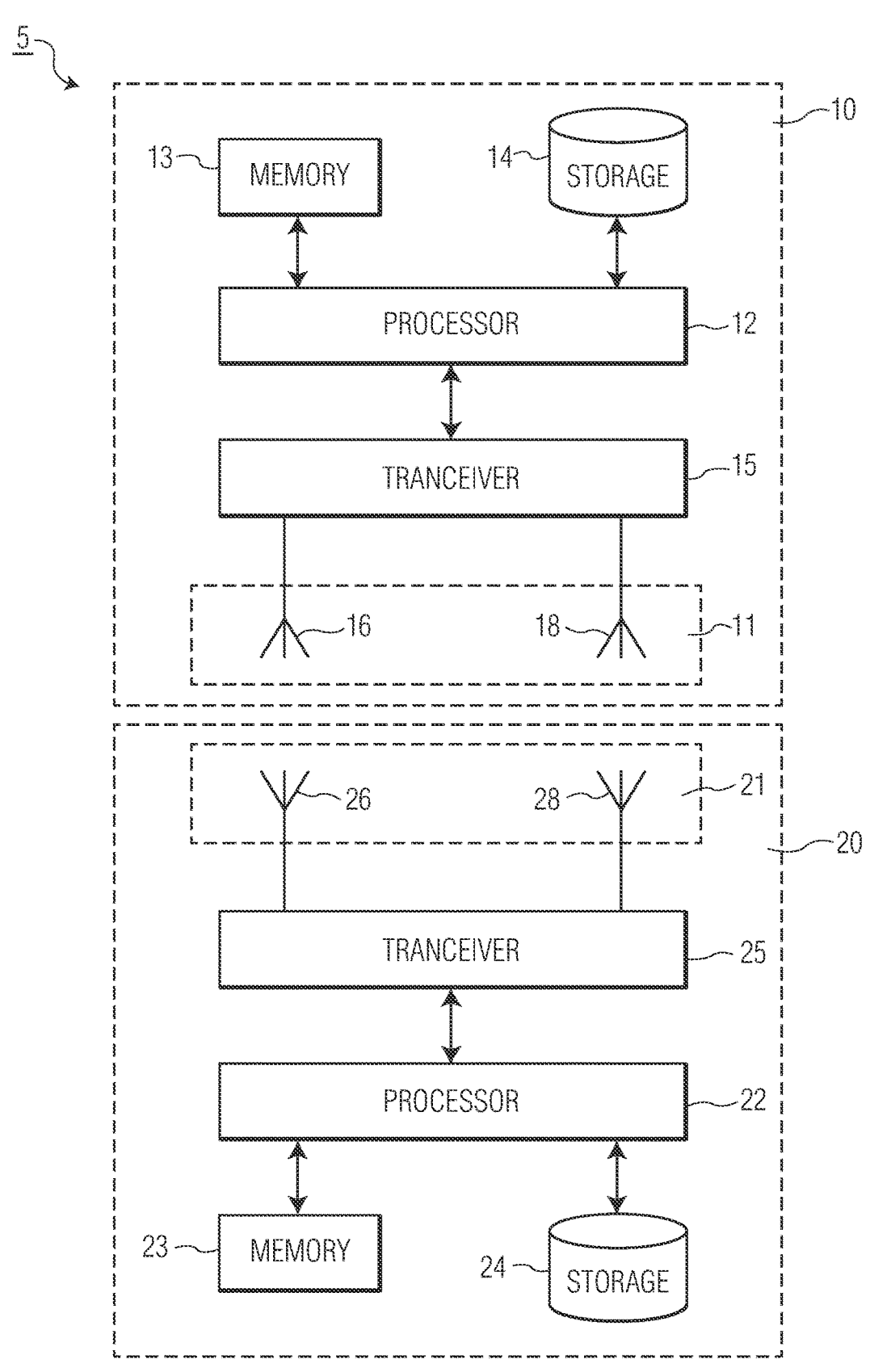
FIG. 1 is a simplified block diagram of a communication system according to the present invention.

A simplified block diagram of a wireless communication system 5 according to the present invention is shown in FIG. 1. In system 5, two devices 10 and 20 communicate with each other (e.g., automatically) when placed in very close proximity to each other. In the current embodiment, each of devices 10 and 20 is a small, standalone, battery-powered, portable and/or handheld electronic device (e.g., having a maximum dimension of 10-20 centimeters (cm)), such as a smart phone, smart-phone accessory, backup or other data-storage device, charger, watch, dedicated GPS device, or other device incorporating any combination of the foregoing structures and/or functions. However, as discussed below, in alternate embodiments, either or both of devices 10 and 20 can be components of larger (e.g., externally powered, less mobile or even completely immobile) systems, machines, or other items (such as charging devices, laptops, tablets, or even large industrial machines).

In one specific example, the first device 10 is a smart phone (which includes a GPS system) and the second device 20 is a portable storage device, such as a portable hard drive or solid-state drive. For example, device 20 might store mapping information for use by a navigation app running on the first device 10, e.g., when the first device 10 does not have access (or fast enough access) to a mobile wireless network to download such map information in real time. When this occurs, first device 10 preferably automatically retrieves from second device 20 the map information for the geographic area surrounding the position indicated by first device 10's GPS. Conversely, in this example, when device 10 does have good access to a mobile wireless network (or to a Wi-Fi network for that matter), device 10 (when placed in close proximity to device 20) preferably communicates this back to device 20 (using the present communication system of the present invention), and then the two devices 10 and 20 coordinate (again using the present communication system of the present invention), causing device 10 to download any map updates needed by device 20 (using such Wi-Fi or mobile wireless network) and transfer such updated map information to device 20 (using the present communication system).

In a similar example, wireless communication system 5 can be used to synchronize data stored in two different devices 10 and 20 when the two are in close proximity to each other. Such a system can permit easy backups and/or allow a user to seamlessly move from one device 10 (which could be a computer, docking station for attachment to a computer, smart phone, etc.) to another 20 (which could be a different computer, docking station for attachment to a computer, smart phone, etc.) and still have access to all of the same information.

Still further, device 10 could be a special-purpose mobile device, e.g., for use in a factory or other commercial establishment, and device 20 could be any of a number of larger, e.g., mostly fixed-location machines that are desired to communicate with device 10 for receiving firmware and/or other updates from device 10 and/or for uploading status and/or other information to device 10.

In still further environments, both devices 10 and 20 are incorporated into the same larger product. For example, in one embodiment device 10 is incorporated into a laptop keyboard/base and device 20 is incorporated into the laptop's screen. In this case, e.g., display information can be transferred from keyboard/base to the display screen, and touchscreen data can be transferred from the display screen to the keyboard/base without the need for a physical connection (thereby enabling designs that are not possible when a physical data port or connection is required. Similarly, devices 10 and 20 could be attached to different parts of a larger factory or other commercial machine that are movable relative to each other and yet would benefit from short-range data transfers.

Figure 2:
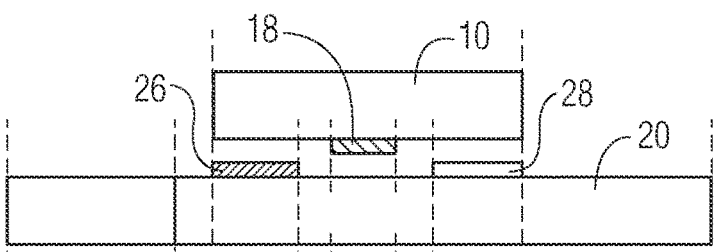
FIG. 2 is a side elevational view of two devices, rotated or misaligned relative to each other, attempting to communicate at very short range.
Figure 3:
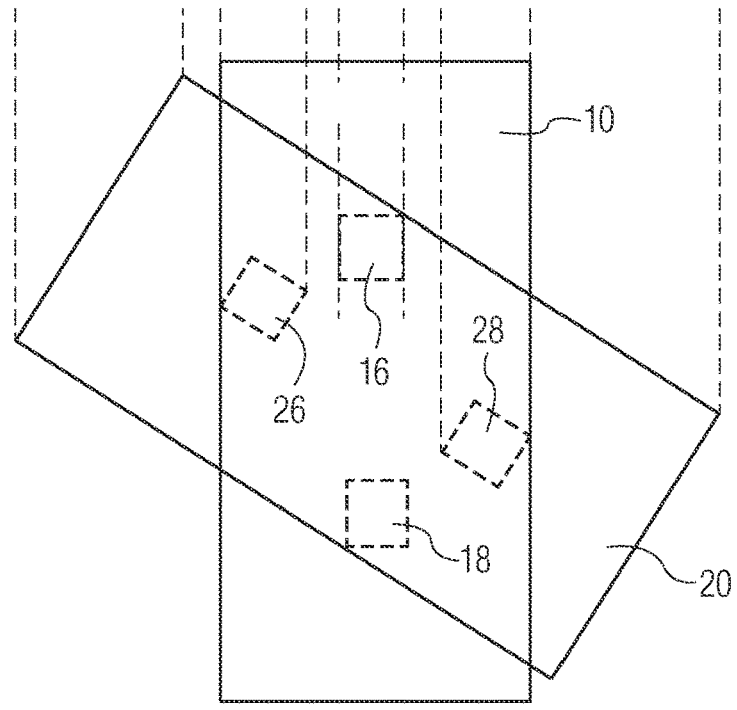
FIG. 3 is a bottom plan view of the devices shown in FIG. 2.

In any event, devices 10 and 20 preferably are configured to communicate at very short distances, such as when such devices 10 and 20 are not greater than 100, 50, 25 or even 10 mm (millimeters) apart. In many cases, the devices 10 and 20 will be directly abutting each other when such communications take place, such as where one of the devices 10 or 20 is placed directly on top of the other. This situation is illustrated in FIGS. 2 and 3. As a result, such communications typically can take place with very low power consumption and, correspondingly, very low transmission power, which can be particularly important if devices 10 and/or 20 are small and battery-powered and/or if it is desired to limit the amount of transmissions broadcast into the surrounding environment (e.g., for security reasons, to allow other devices within the same vicinity to utilize the same frequency band, and/or just generally to reduce or even eliminate the introduction of electromagnetic noise into the surrounding environment).

As shown, device 10 includes processor 12 (e.g., for executing stored machine-readable process steps to implement the methods of the present invention), memory 13 (e.g., for short-term storage of such process steps, as well as data used in such processing), bulk data storage device 14 (e.g., for longer-term storage of such process steps and data), radio-frequency transceiver 15, and antenna radiative elements 16 and 18. Similarly, device 20 includes processor 22, memory 23 (such as read-only memory and/or random-access memory), bulk data storage device 24 (such as a solid-state drive or hard drive), radio-frequency transceiver 25, and antenna radiative elements 26 and 28 (e.g., each of the foregoing being analogous to the corresponding component of device 10). As already indicated, devices 10 and 20 preferably are configured for full-duplex communications (i.e., simultaneously using the same frequencies, typically a contiguous band of frequencies, for communications in both directions—both transmission and reception) at fairly high data rates (e.g., a data rate of at least 100 megabits per second (Mb/s), 500 Mb/s, 1 gigabits per second (Gb/s), 10 Gb/s, 20 Gb/s, 40 Gb/s or even 80 Gb/s), more preferably, making maximum use of the frequency bandwidth available. In any event, in the preferred embodiments of the invention, the same frequency band is used simultaneously for transmissions in both directions, in order to take maximum advantage of the available bandwidth.

Due to the desired very short-distance, very high data-rate, full-duplex, and low-power wireless applications, transceiver 15 and transceiver 25 preferably operate at a frequency in the gigahertz (GHz) range (e.g., using a carrier frequency of at least 2, 5, 10, 20, 40, 60, 140 or even 250 GHz) and use a modulation/demodulation technique such as On Off Keying (OOK), Four-Level Pulse Amplitude Modulation (PAM4) or Quadrature Phase Shift Keying (QPSK). Moreover, in view of the associated low spectral efficiency and in order to maximally utilize the allowable spectral bandwidth to achieve the desired very high data rates, spatial division duplexing (SDD) and in-band full-duplex (IBFD) preferably are employed, within a relatively wide frequency band (e.g., at least 2, 5, 10, 20 or even 40 GHz). In one specific IBFD embodiment, a 7 GHz bandwidth is used on a 60 GHz carrier frequency for 10 Gb/s full-duplex communications.

For simplicity, many portions of this disclosure refer only to device 10 (and its components, e.g., antenna module 11 and radiative elements 16 and 18). However, it should be understood that the same considerations preferably also apply to device 20 (and its corresponding components, e.g., antenna module 21 and its radiative elements 26 and 28, respectively). Also, although the term "radiative element" often is used (e.g., in reference to radiative elements 16 and 18), and any given time one of such elements typically will be transmitting while the other is receiving. Depending upon the specific embodiment, those roles may be fixed (e.g., so that element 16 always transmits and element 18 always receives, or vice versa), or they may be changed dynamically, e.g., to maximize transmission efficiency.

In operation, processor 12 provides data that is desired to be transmitted to transceiver 15, which then modulates such data into the operating frequency band (again, typically using a carrier frequency in the gigahertz range) and provides the modulated signal to one of the radiative elements 16 and 18 for broadcasting. Also, transceiver 15 simultaneously is receiving a signal on the same frequencies via the other of radiative elements 16 and 18, demodulated net received signal, and providing the resulting data to processor 12. As already indicated, such two-way communications (e.g., with a second device 20) occur over a very short distance (typically, not more than 50-100 mm). In this regard, unless stated otherwise, references herein to a particular communication channel length, range or distance refers to the distance between the centroids of the antenna modules (e.g., 11 and 21) for the two communicating devices (e.g., 10 and 20). However, such distances instead could refer, e.g., to the minimum distance between such antenna modules or the maximum distance between such antenna modules.

The system objectives discussed above mean that a unique combination of problems must be addressed simultaneously. For example, efficient use of the transmission power is a consideration. Also, the issue of self-interference between the two transmission channels must be addressed, i.e., transmissions from the transmitting one of device 10's radiative elements 16 and 18 will tend to be picked up by its own receiving element (i.e., the other one of its radiative elements 16 and 18). Still further, due to the small separation distances between devices 10 and 20, particularly in light of the typically small sizes of such devices 10 and 20, small rotational misalignments between the transmitting radiative element (e.g., element 16 or 18 of device 10) and the receiving radiative element (e.g., element 26 or 28 of device 20) can tend to significantly degrade performance. This latter problem is illustrated in FIGS. 2 and 3, in which radiative elements 16 and 18 of device 10 are misaligned with radiative elements 26 and 28 of device 20, due to the large separation between radiative elements 16 and 18, the large separation between radiative elements 26 and 28, and the rotational misalignment between device 10 and device 20.

Many conventional approaches to addressing such problems have been employed in other types of communication systems. For example, electronic self-interference cancellation and/or providing isolation between the transmit and receive antenna within one device have been employed to reduce self-interference. However, the present inventors have discovered that such approaches are not well-suited for the present types of communication systems, e.g., system 5. Specifically, electronic self-interference cancellation generally can only sufficiently suppress self-interference in a limited bandwidth, and it tends to be a complex and expensive solution in terms of real estate and power consumption. The present inventors have discovered that the other conventional approach, i.e., isolating a device's transmit and receive antennas by creating physical distance between them is unsuitable when using the short transmission distances between devices that is desired in a system according to the present invention because such separation distances would exacerbate the rotational misalignment problem noted above in connection with the discussion of FIGS. 2 and 3, leading to a loss of link budget, and resulting in the need for even more isolation because of the greater required transmission output power.

The present invention primarily (although not exclusively) focuses on antenna designs to address the foregoing problems. In this regard, many different antenna designs currently exist, each potentially having different strengths, shortcomings and limitations. At the same time, such strengths, shortcomings and limitations often are not well-studied and, therefore, not well-understood, particularly in relation to each individual context (e.g., type of system and/or environment) in which the antenna might be operated. As a result, selecting the best antenna design for a particular wireless communication system often is very difficult and time-consuming. The natural tendency, therefore, often is to simply employ the same antenna designs that have been useful in other, previous applications.

Figure 4:
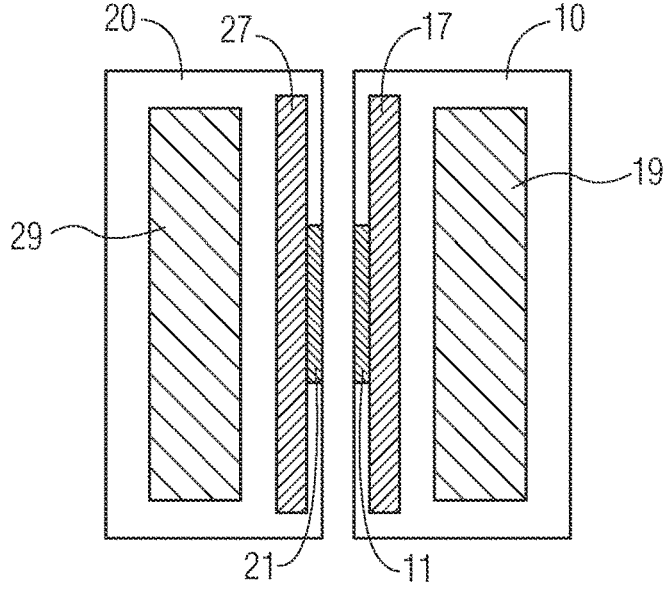
FIG. 4 is a side sectional view of two devices communicating at very short range using a monostatic antenna structure according to the present invention.

In the preferred embodiments, device 10 has a small, compact antenna module 11 (e.g., having a maximum dimension of less than 10, 20 or 50 mm) that includes the two radiative elements 16 and 18, one for transmitting and one for receiving. Similarly, device 20 has a small, compact antenna module 21 that includes the two radiative elements 26 and 28, again, one for transmitting and one for receiving. In use, the two antenna modules 11 and 21 are positioned opposite to each other, at a distance that is comparable to, or even smaller than, the dimensions (e.g., the maximum dimension) of such antenna modules 11 and 21 (e.g., a distance not greater than 100, 50, 30, 20 or even 10 mm). Such a configuration is shown in FIG. 4, in which each antenna module (e.g., antenna module 11) is separated from the other reflective portions 19 of the corresponding device 10 (such as the processor 12, memory 13 and a battery) by an absorber 17. In the preferred embodiments, transmission power provided by the transceiver 15 or 25 is not greater than 10 or 20 decibel-milliwatts (dBm), e.g., for the reasons noted above.

For the very short communication distances of system 5, radiative elements 16 and 18 preferably are closely integrated with each other within module 11 (even more preferably, having components that are enmeshed with each other) and where the centroid of radiative element 16 and the centroid of radiative element 18 either are the same or are points along (or within an insubstantial distance from) a single line that is perpendicular to the planes in which radiative elements 16 and 18 lie (in either case, referred to herein as such having a common projected centroid). Unless specified otherwise herein, the centroid of radiative element 16 or 18 refers to its geometric center (i.e., the arithmetic mean position of all the points in the subject structure). Unless specified otherwise herein, the expression "insubstantial distance", as used in this paragraph, means a maximum distance that is not greater than 10% of the maximum dimension of the corresponding antenna module 11. Even more preferably, such maximum distance is not greater than 5% or even 2% of the maximum dimension of the corresponding antenna module 11.

In addition, relevant structures within antenna module 11 (e.g., excluding shielded structures and structures that are electromagnetically isolated, such as through the use of meta-material absorbers) preferably observe certain symmetry requirements described in greater detail below. Even more preferably, relevant structures 30 pertaining to antenna module 11 (which include relevant structures within antenna module 11 itself and relevant surrounding structures, i.e., those having an impact on the electromagnetic properties of antenna module 11) observe such symmetry requirements. In each such case, such symmetry requirements typically apply to the shapes and material properties of the relevant structures of antenna module 11 (and again, more preferably, relevant structures 30, with it being noted that references herein to relevant structures 30 are intended to include specific references to relevant structures within antenna module 11). Due to the symmetrical monostatic antenna arrangements of the present invention, misalignment of the radiative elements 16 and 18, on one hand, and the radiative elements 26 and 28, on the other, upon rotation of the devices 10 and 20 relative to each other, as well as self-interference (i.e., reception by a device's receiving element of transmissions broadcast by its own transmitting element), often can be simultaneously reduced or avoided. As shown in FIG. 4, in situations where the antenna environment disturbs this symmetry, for instance due to scattering from reflective parts (19 or 29) inside the overall device (10 or 20, respectively), (metamaterial) absorber(s) (17 or 27, respectively) preferably are added behind and/or around the antenna module (11 or 21, respectively), thereby eliminating, or at least mitigating, the effects of asymmetrical structures.

Figure 5:
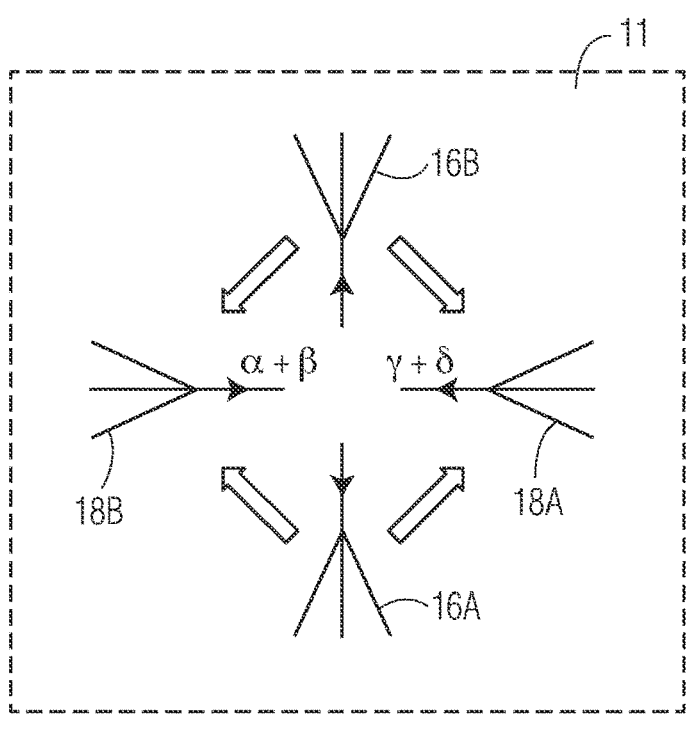
FIG. 5 is a conceptual diagram illustrating self-interference in an antenna module.

The goal of the desired symmetry is to obtain self-interference crosstalk cancellation. FIG. 5 illustrates such self-interference crosstalk. There, antenna module 11 uses symmetry to provide inherent isolation between its transmit antenna (in this particular example, radiating element 16, which consists of parts 16A and 16B) and its receive antenna (in this example, radiating element 18, which consists of parts 18A and 18B). In this configuration, electromagnetic crosstalk from transmit antenna part 16A results in a voltage α at the sub-port of receive antenna part 18B, electromagnetic crosstalk from transmit antenna part 16B results in a voltage β at the sub-port of receive antenna part 18B, electromagnetic crosstalk from transmit antenna part 16A results in a voltage γ at the sub-port of receive antenna part 18A, and electromagnetic crosstalk from transmit antenna part 16B results in a voltage δ at the sub-port of receive antenna part 18A. The effective differential crosstalk voltage seen over the differential port of the overall receive antenna 18 thus is $(\alpha+\beta)-(\gamma+\delta)$.

The present invention preferably uses an antenna topology with such a symmetry that one or both of the following crosstalk cancellation types (I and II) is true:

Crosstalk Cancellation Type I: $(\alpha+\beta)=(\gamma+\delta)$, under the condition that the signal at the receiving port is processed perfectly balanced, and/or Crosstalk Cancellation Type II: $\alpha+\beta=0$ and $\gamma+\delta=0$, under the condition that the signal at the transmitter port is perfectly balanced.

For both cases then, the effective differential crosstalk voltage is zero implying perfect isolation in between both antennas. The present invention preferably uses an antenna topology with such a symmetry that both Crosstalk Cancellation Types I and II are true. Although the monostatic antenna module 11 in the above example is decomposed into four separate parts, it should be understood that such a module instead can be implemented using two differential two-port antennas or even one antenna with four ports, two for the receiver and two for the transmitter.

Some of the considerations pertaining to symmetry are now discussed with reference to FIG. 6, which depicts the relevant physical space 30 around an antenna module. As shown, relevant physical space 30 includes radiative element 16 (functioning as the transmitting antenna) and radiative element 18 (functioning as the receive antenna). Waveguide 32 transports the transmission signal from the transceiver 15 to the radiative element 16, and waveguide 35 transports the received signal from the radiative element 18 to the transceiver 15. Physical space 30 contains the following structures: radiative element 16 which is transmitting electromagnetic energy in this particular example at this particular point in time, port 33 where waveguide 32 connects to physical space 30 (more specifically, to radiative element 16), radiative element 18 which is receiving electromagnetic energy in this particular example at this particular point in time, port 36 where waveguide 35 connects to physical space 30 (more specifically, to radiative element 18), and typically, other structure(s) 37 (e.g., reflective portions 19, refractive portions, diffractive portions and/or absorbing portions) that are relevant for the electromagnetic interactions between the radiative element 16 and the radiative element 18. In certain embodiments, rather than just a single waveguide, there can be multiple waveguides 32 connecting to port 33 and/or multiple waveguides 35 connecting to port 36. It is also noted that the waveguides 32 and 35 (assuming they are shielded) are not themselves part of the physical space 30. Unless indicated otherwise, the waveguides referenced herein preferably are implemented as shielded transmission lines. Generally speaking, the relevant structure pertaining to the antenna module 11 can encompass the entire set of material properties (such as permittivity, permeability and conductivity), as a function of location, within the physical space 30 (which often will extend beyond the physical or commonly considered boundary of the antenna module 11 itself).

Figure 7:
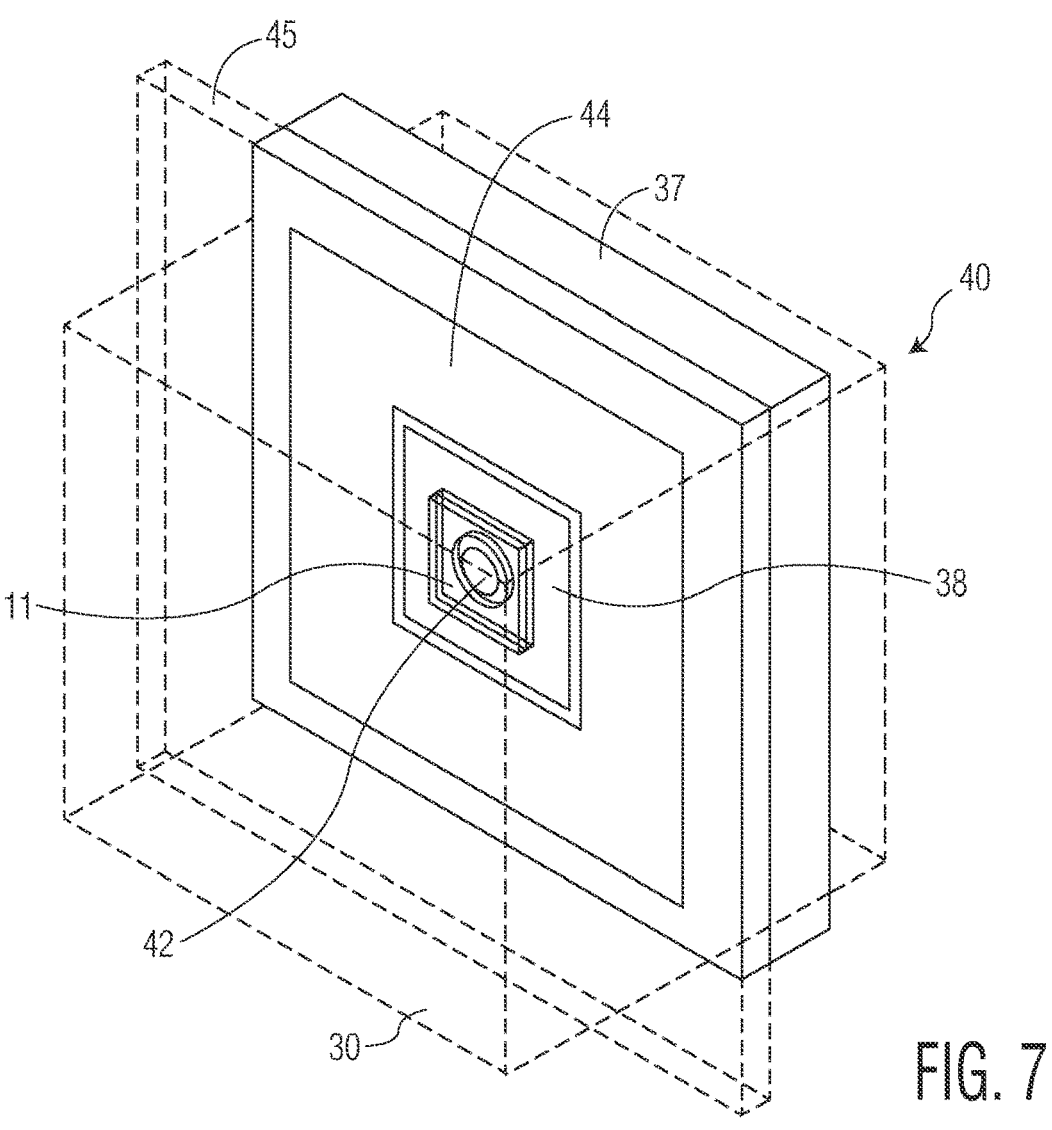
FIG. 7 is a more-detailed perspective view conceptually showing the main portions of a larger structure that includes an antenna module.

FIG. 7 illustrates a more-detailed example of a structure that would embody the foregoing concept. As shown in FIG. 7, in the current embodiment, the antenna module 11 is mounted on a printed circuit board (PCB) 38 and positioned near the front of the overall device 10 (with device 10 being conceptually represented by structure 40 in FIG. 7), with the radiative portion or patch 42 (which includes radiative elements 16 and 18) of antenna module 11 being located approximately at the center of antenna module 11. An electromagnetic radiation absorbing structure/material 44, e.g., made of expanded graphite (EG) on a plastic or other substrate or any other structure/material conventionally used for that purpose, preferably is disposed around and/or behind antenna module 11, thereby providing some isolation from the other (e.g., reflecting) structures 37 of the overall device 10 (such as a battery and/or other parts of the device 10 of which antenna module 11 is a part) and, potentially, other surrounding environmental structures. As a result, the physical space 30 is primarily disposed forward of the radiative portion 42 of the antenna module 11. Finally, a dielectric slab 45 (typically the cover of the device 10 generally is disposed in front of the radiative portion 42.

Figure 6:
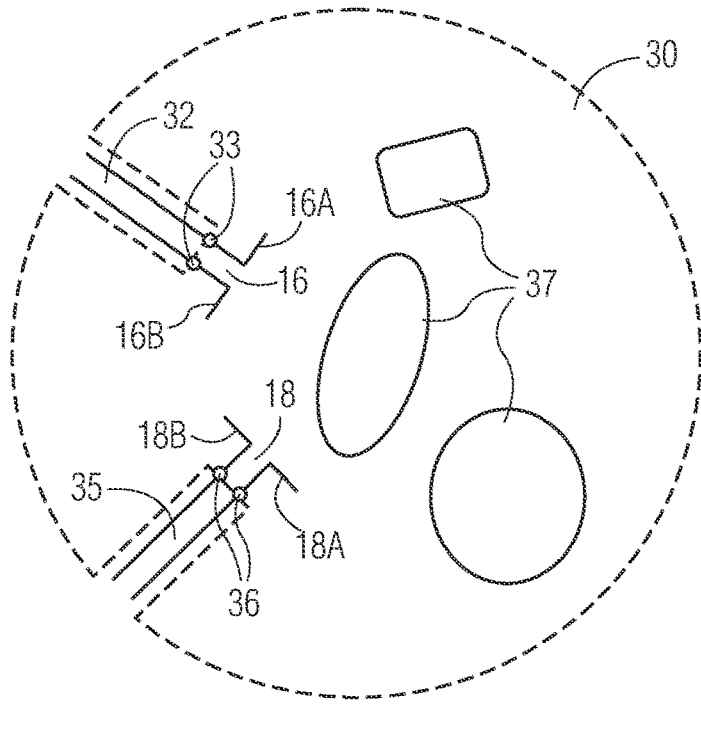
FIG. 6 is a conceptual diagram illustrating certain considerations for determining symmetry.

Although physical space 30 is shown as having a clear boundary and a particular regular/geometric shape in FIGS. 6 and 7, such depictions are solely for ease of visualization. In reality, physical space 30 can be considered to be that part of the total space that gives rise to levels of interaction still relevant to the communication system under consideration (including, e.g., space in which objects might have a material impact on the ability of the radiative portion 42 to properly broadcast and/or receive electromagnetic signals in the subject applications, at least within the relevant bandwidth). Physical space 30 can be influenced by transmission power (e.g., with higher transmission power typically requiring more isolation), absorbing material(s) 44, and other design considerations.

Figure 8:
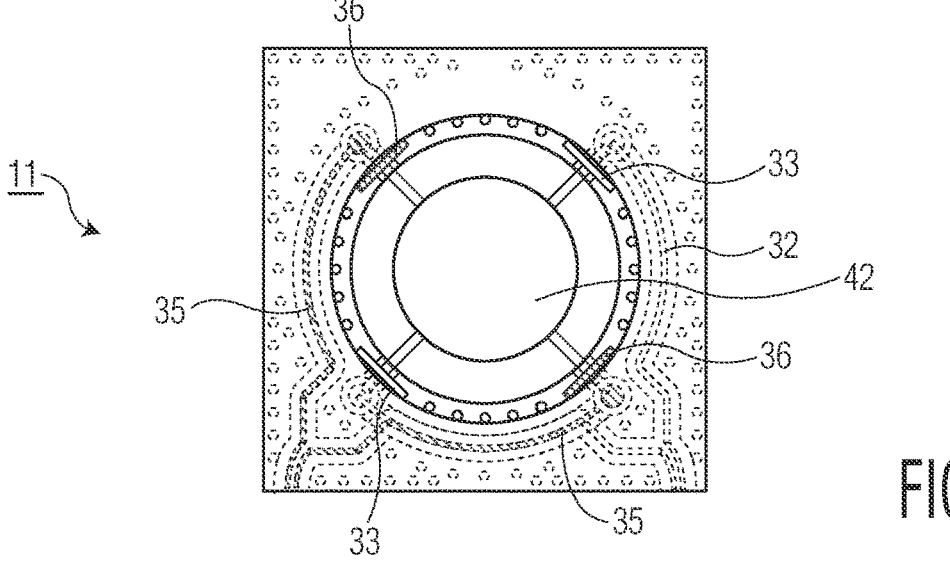
FIG. 8 is a front elevational view of an antenna module.

FIG. 8 shows the general layout of antenna module 11 according to a representative embodiment of the present invention. As shown, each of ports 33 and 36 includes two parts directly opposite to each other. In this particular example, radiative portion 42 is implemented as a stacked circular patch. Other structures are shown in other drawings and discussed below. The portions shown in broken lines (including the waveguides 32 and 35) are shielded and therefore do not form a part of the physical space 30.

In the preferred embodiments, the radiative portion 42, the antenna module 11 or, even more preferably, the relevant structure of the entire physical space 30 exhibits at least one of the following two types of symmetry:

Type 1: There exists at least one plane of symmetry such that if the structure is mirrored with respect to that plane, the resulting structure is congruent to the original structure (i.e., before mirroring). Both Crosstalk Cancellation Types I and II (described above) are obtained if there exist two such orthogonal planes. From an isolation performance point of view, this double-plane symmetry is preferred. A single plane of such symmetry provides at least one of such crosstalk cancellation types (i.e., Crosstalk Cancellation Type I or II).

Type 2: There exists an axis of symmetry such that if the structure is rotated along such axis by 180/n degrees with n being an integer greater than 1 (i.e., n=2 or 3 or 4 or . . . ) the resulting structure is congruent to that before such rotation. In case n=2, such symmetry always provides both Crosstalk Cancellation Types I and II simultaneously.

In the above descriptions, the expression "congruent to" typically means "approximately the same as or approximately the mirror image of". However, the expression also encompasses equivalent congruence (e.g., in which compensation is made for differences in materials, electromagnetic properties, etc. by other offsetting design features). The word "approximately" is used above in recognition of the fact that there typically will be some variation due to imperfect manufacturing processes.

As noted in the preceding discussion, ideally, the relevant structures within the entire physical space 30 exhibit such symmetry. However, in practice, it might not be possible to fully control any physical object that might be present within physical space 30. Nevertheless, in the preferred embodiments, at least the portions of device 10 that are within physical space 30 (e.g., including ports 33 and 36, but excluding the shielded waveguides 32 and 35) and/or at least the portions of the antenna module 11 that are within physical space 30 exhibit such symmetry.

Figure 10:
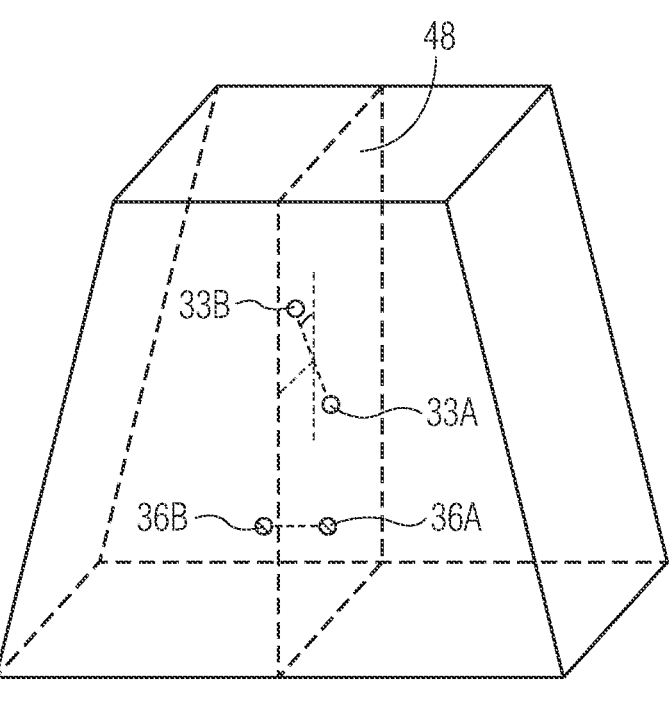
FIG. 10 illustrates relevant structure having Type 1 symmetry with respect to a single plane of symmetry.
Figure 11:
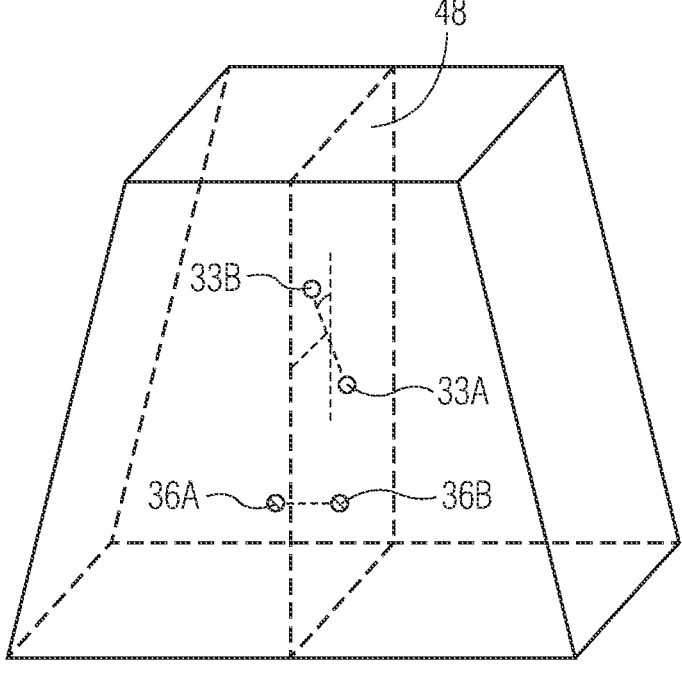
FIG. 11 illustrates the relevant structure shown in FIG. 10 after mirroring.
Figure 12:
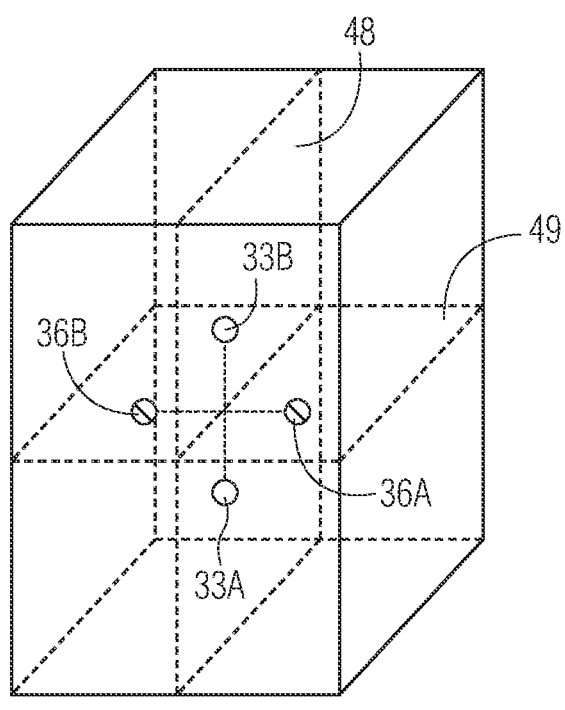
FIG. 12 illustrates relevant structure having Type 1 symmetry with respect to two planes of symmetry.
Figure 13:
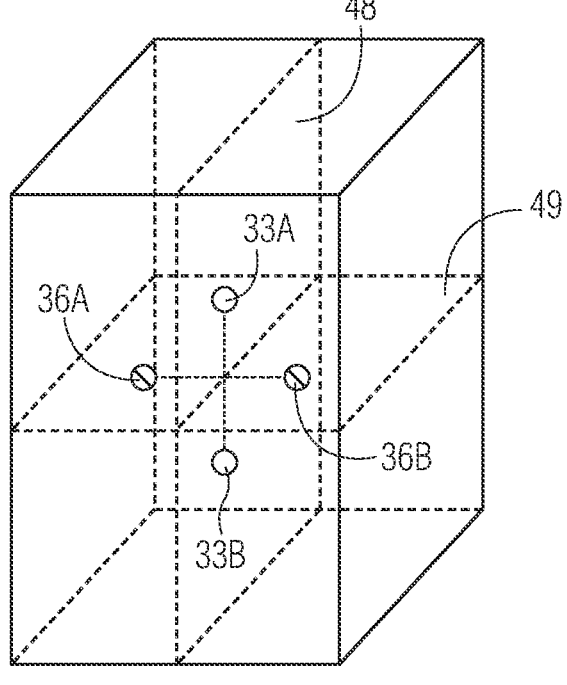
FIG. 13 illustrates the relevant structure shown in FIG. 12 after mirroring.
Figure 14:
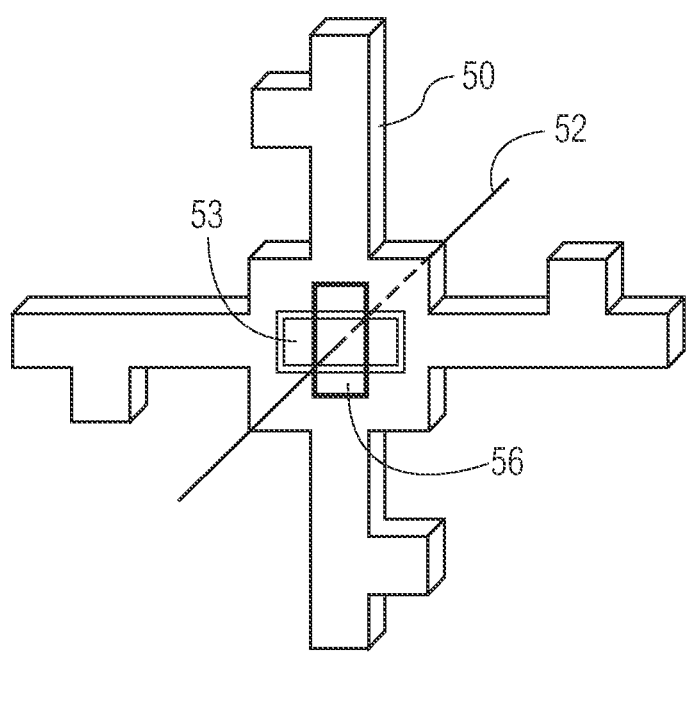
FIG. 14 illustrates relevant structure having Type 2 symmetry for 90° rotation.
Figure 15:
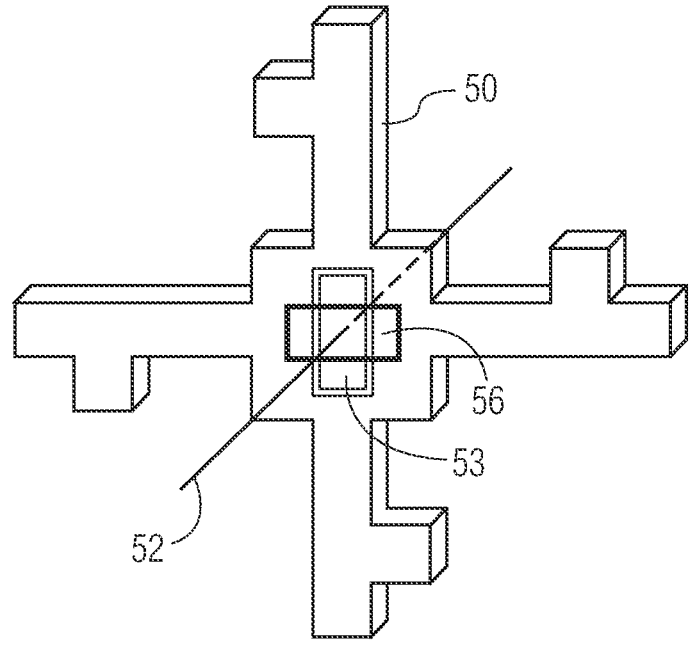
FIG. 15 illustrates the relevant structure shown in FIG. 14 after such 90° rotation.

FIG. 10 illustrates a structure having Type 1 symmetry with respect to a single plane of symmetry 48, where port 33 is comprised of two sub-ports 33A and 33B, and port 36 similarly is comprised of two sub-ports 36A and 36B. FIG. 11 illustrates the same structure after mirroring; as shown, sub-ports 33A and 33B of port 33 are not changed in the mirrored versions because they lie in plane 48, but sub-ports 36A and 36B of port 36 simply swap positions because they are mirror images of each other on opposite sides of plane 48. FIG. 12 illustrates a structure having Type 1 symmetry with respect to two planes of symmetry 48 and 49, where again port 33 is comprised of two sub-ports 33A and 33B, and port 36 similarly is comprised of two sub-ports 36A and 36B. FIG. 13 illustrates the same structure after mirroring; here, sub-ports 33A and 33B of port 33 lie in plane 48 and are mirror images of each other in plane 49, while sub-ports 36A and 36B of port 36 lie in plane 49 and are mirror images of each other in plane 48. FIG. 14 illustrates relevant structure 50 of an antenna module having Type 2 symmetry for 90° rotation with about an axis 52 with ports 53 and 56. FIG. 15 illustrates the same structure after such 90° rotation; as shown, the relevant structure 50 remains the same, but with ports 53 and 56 swapping positions and orientations.

In addition to the previously described types of symmetry in the antenna structure alone, in the preferred embodiments the port fields (either the instantaneous magnetic (H) or electric (E) field) satisfy the corresponding one of the following requirements. Specifically, for Type 1 symmetry:

the port fields when port 33 is driven and port 36 is terminated are symmetrical with respect to one of the symmetry planes, and the port fields when port 36 is driven and port 33 is terminated are anti-symmetrical with respect to the same symmetry plane, or vice versa.

Figure 9:
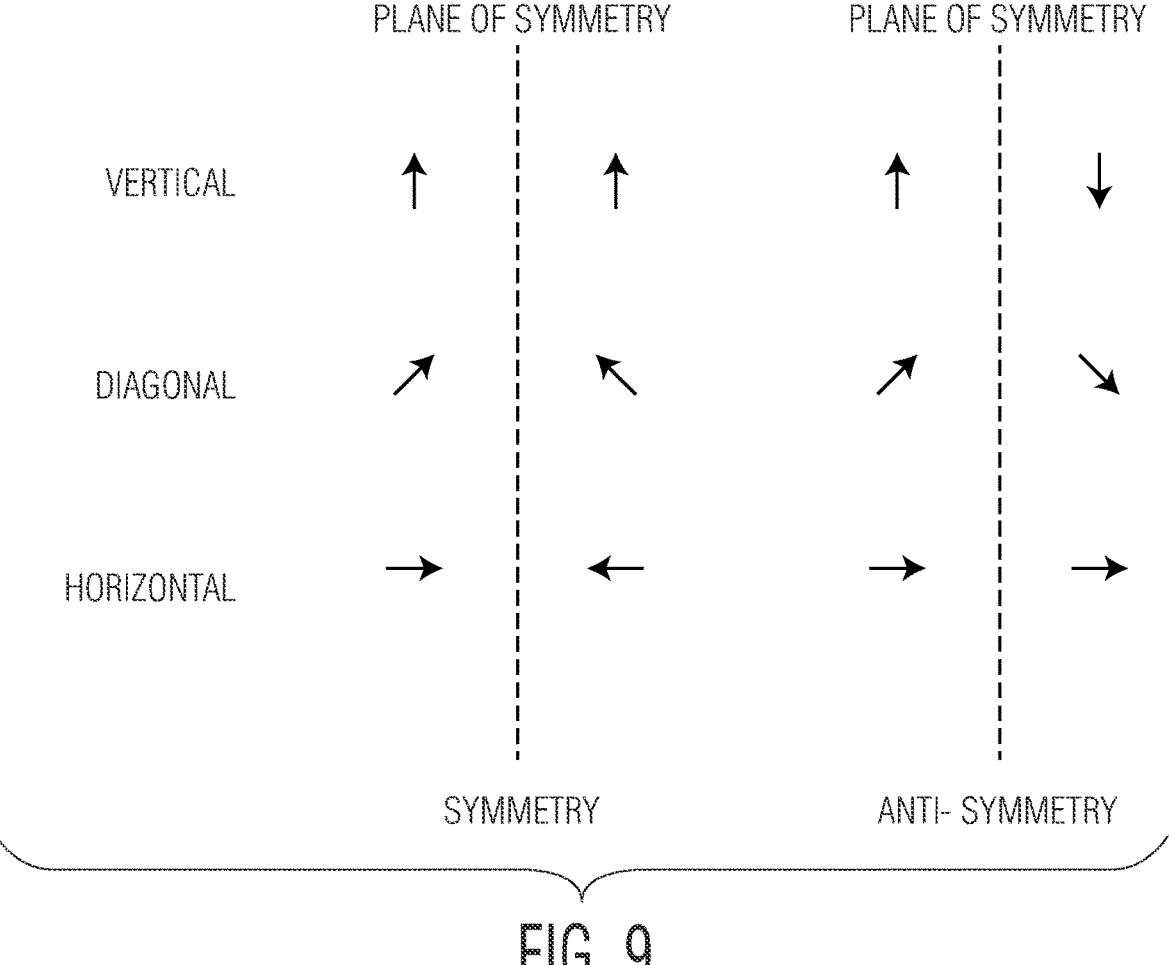
FIG. 9 illustrates the field directions on opposite sides of a plane of symmetry required to satisfy a symmetrical condition or an anti-symmetrical condition.

The field directions on opposite sides of a plane of symmetry required to satisfy the foregoing symmetrical condition or the foregoing anti-symmetrical condition are illustrated in FIG. 9. This is obtained by driving one port (e.g., port 33 in FIG. 8) in a balanced way and terminating the other port (e.g., port 36 in FIG. 8) in a balanced way.

For Type 2 symmetry, the port fields, for one port (e.g., port 53 in FIG. 14) being driven and the other port (e.g., port 56 in FIG. 14) being terminated, when physically rotated 360/n degrees, where n is an integer greater than 1 (i.e., n=2, or 3, or 4, or . . . ) around the symmetry axis of the monostatic antenna structure and phase shifted by the same 360/n degrees, are identical to the unrotated port fields before phase shifting. For the simplest case where n=2, this is obtained when driving one port in a balanced way and terminating the other port in a balanced way.

Figure 16:
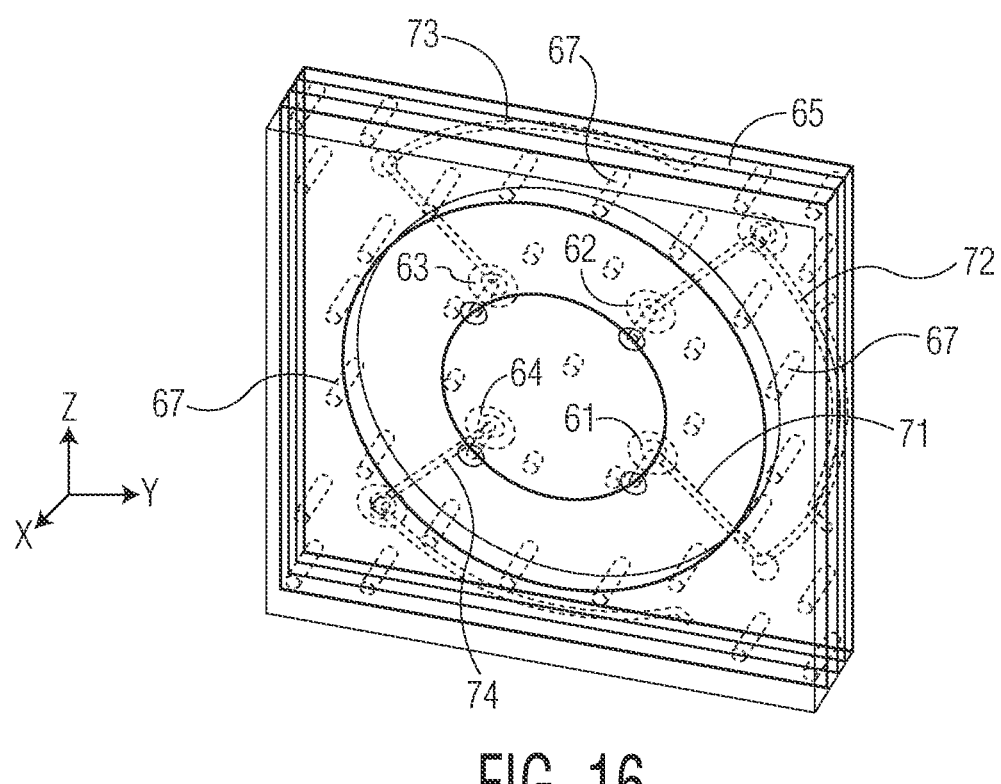
FIG. 16 is a perspective view of a laminate circular-patch monostatic antenna structure.
Figure 17:
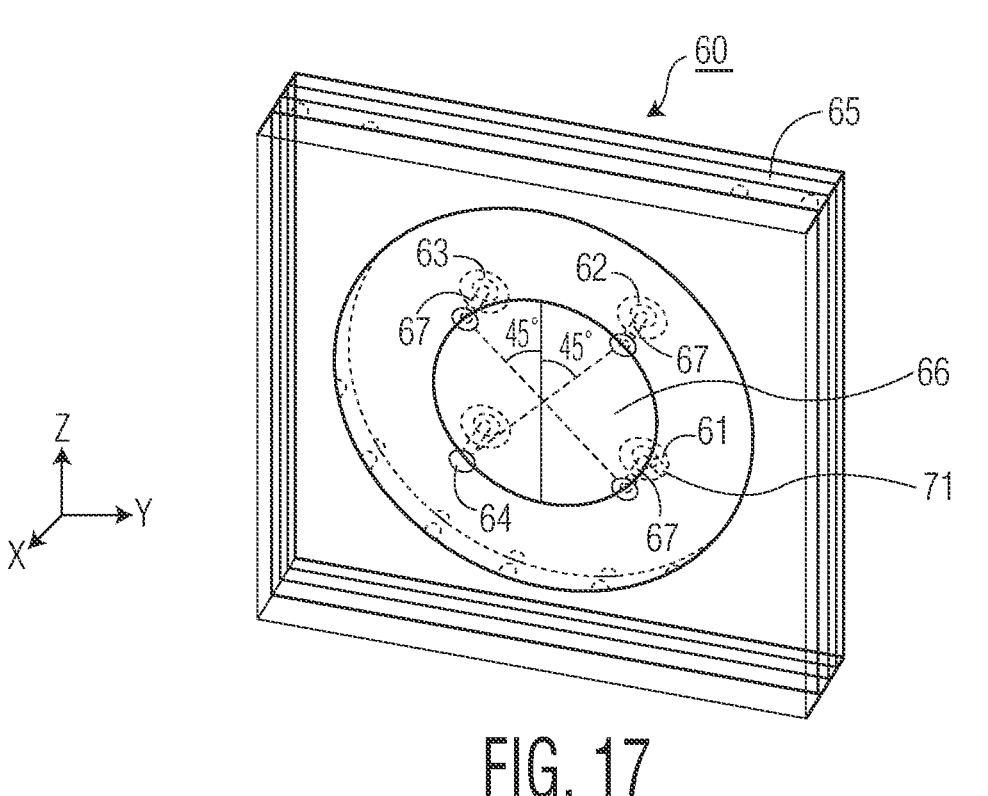
FIG. 17 is a perspective view showing only the electromagnetically relevant structure of the laminate circular-patch monostatic antenna structure.

FIG. 16 shows an exemplary monostatic antenna structure 60 that can be used as antenna module 11, and FIG. 17 depicts just the electromagnetically relevant structure of the overall structure 60, illustrating one example of Type I symmetry with two symmetry planes. Antenna structure 60 uses a circularly shaped patch or radiating element 66, implemented in a laminate technology. It has four coaxial sub-ports 61-64, each consisting of a via 67 that connects through a circular opening in the ground plane 65 to the patch 66. Sub-ports 61 and 63 together form the differential port 33, e.g., for the transmitter. Sub-ports 62 and 64 form the differential port 36, e.g., for the receiver. This structure provides Type 1 symmetry with two planes of symmetry (with ports 33 and 36 included in these two symmetries). Therefore, antenna 60 simultaneously provides both Cross-talk Cancellation Types I and II under the condition that the signal at the transmitter port is perfectly balanced and that the signal at the receiver port is processed perfectly balanced by the receiver. Although the patch 66 has a circular shape, this monostatic antenna is meant for transmission and reception of linearly polarized waves, either with a +45° or −45° orientation with respect to the z-axis. Below the ground plane 65, the port vias 61-64 connect to corresponding waveguides (e.g., transmission lines) 71-74, which are used to transport electromagnetic energy from the transmitter portion of the transceiver 15 to the antenna 60, and from the antenna 60 to the receiver portion of the transceiver 15. The transmission lines 71-74 are not symmetrical with respect to the two symmetry planes, which is not relevant because they are not part of the monostatic antenna structure 60 due to the fact that they are shielded. In alternate embodiments, a different patch shape that satisfies Type 1 or Type 2 symmetry is used.

Figure 18:
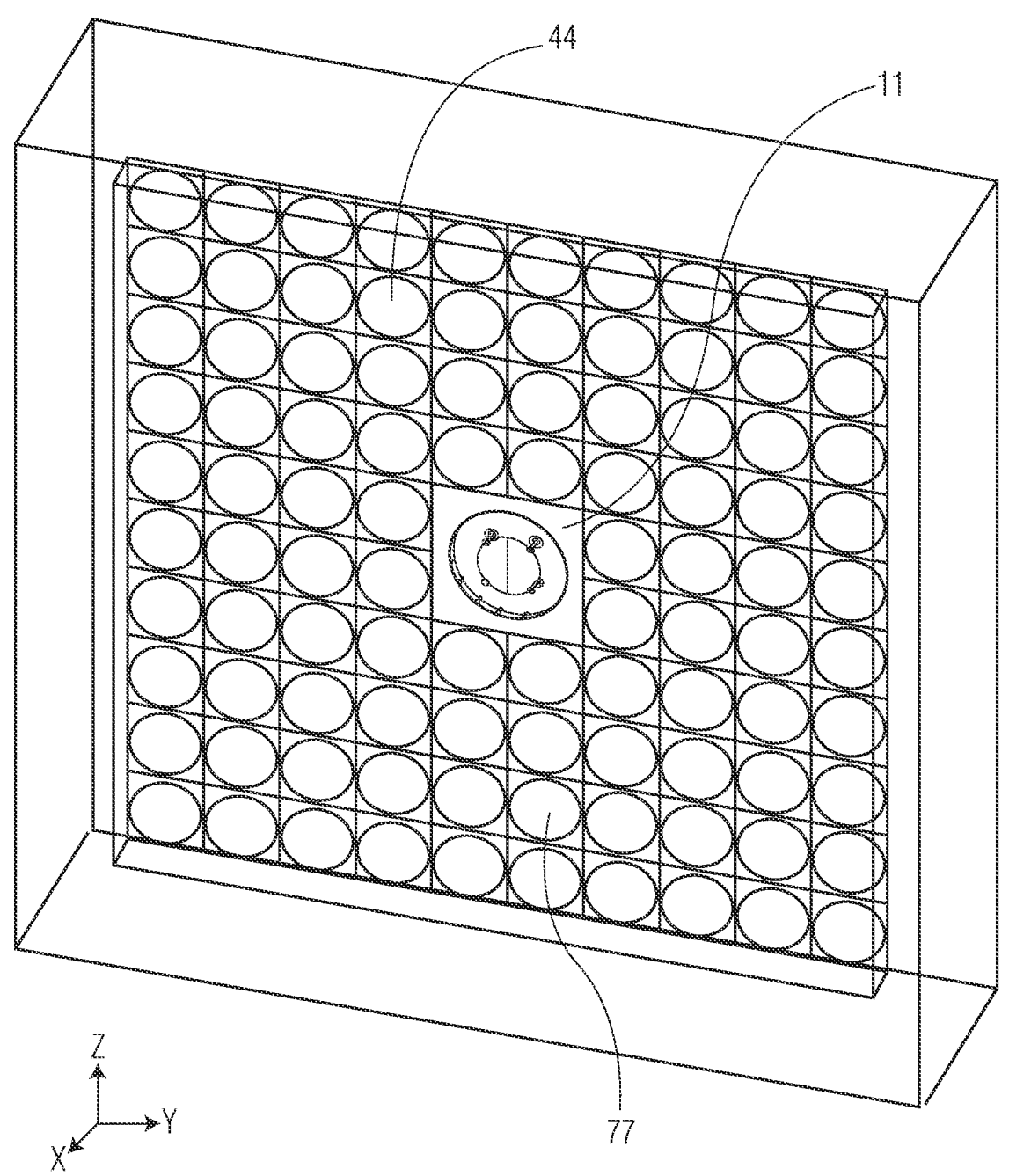
FIG. 18 is a perspective view of a portion of device that includes a metamaterial absorber.
Figure 19:
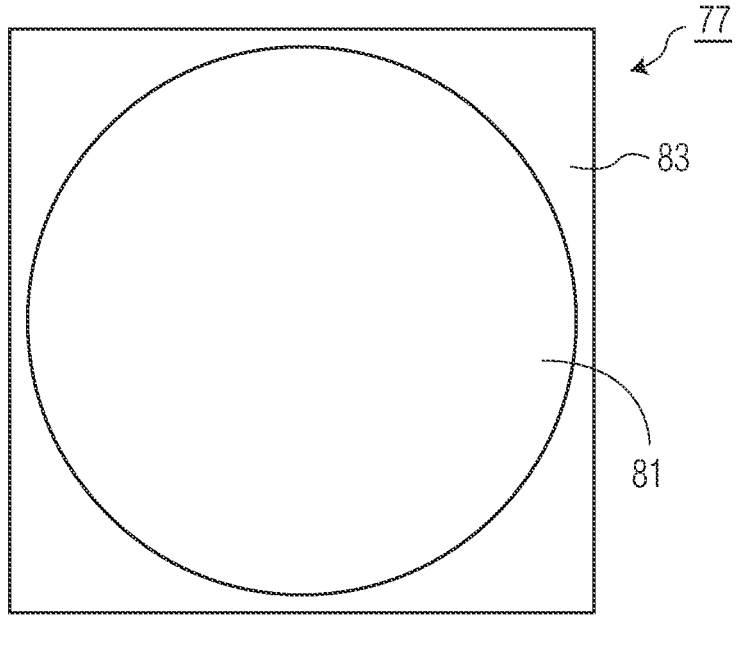
FIG. 19 is a front elevational view of a single metamaterial absorber cell.
Figure 20:
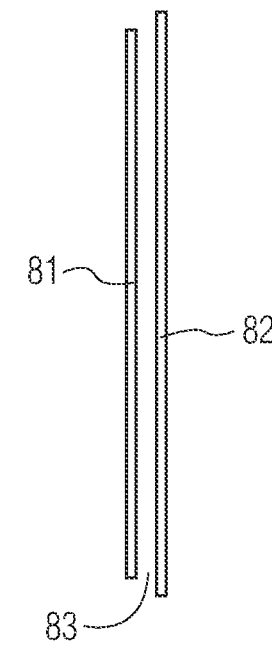
FIG. 20 is a side sectional view of a single metamaterial absorber cell.

FIG. 18 illustrates a portion of device 10 in which a metamaterial absorber 44 surrounds the monostatic antenna module 11 and also may be disposed between antenna module 11 and the other portions of device 10 behind it. As shown, metamaterial absorber 44 includes an array of cells 77. A single such cell 77 (shown in FIGS. 19 and 20) includes two conducting layers 81 and 82, made of EG (i.e., non-metallic) in the present embodiment, separated by a dielectric substrate layer 83. The lower EG layer 82 is a solid ground layer, the top layer 81 contains a circularly shaped resonator structure. When placed repetitively, e.g., as shown in FIG. 18, the structure acts as an absorber for both transverse electric (TE) and transverse magnetic (TM) waves impinging under a range of angles, and for a relatively wide frequency range. In alternate embodiments, other metamaterial-absorber structure(s) are used instead or in addition.

Figure 21:
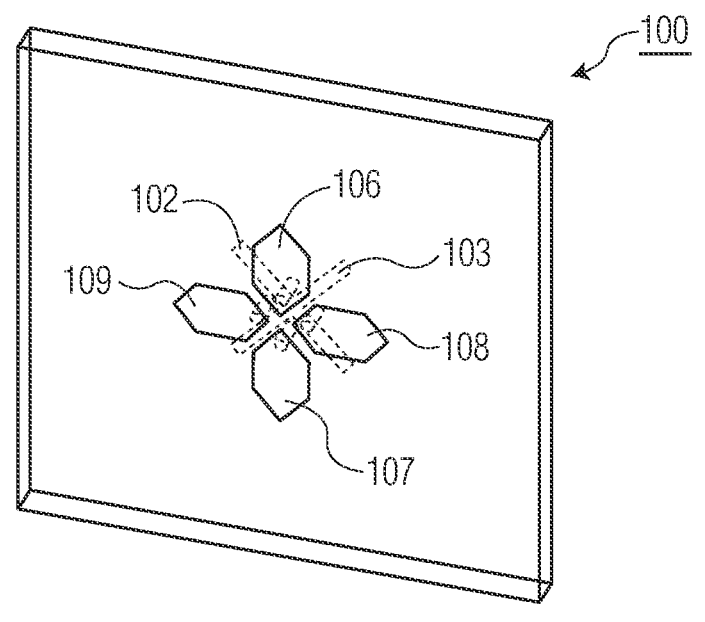
FIG. 21 is a perspective view of a slot-fed magneto-electrical dipole antenna module.
Figure 22:
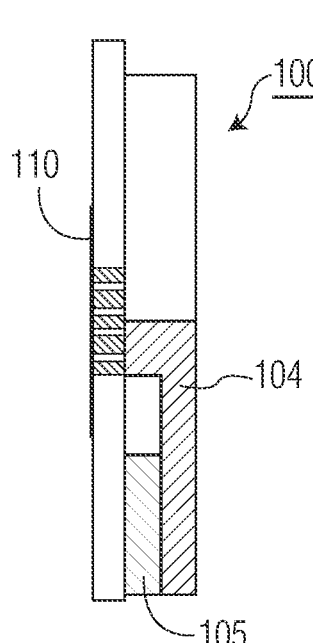
FIG. 22 is a side sectional view of the slot-fed magneto-electrical dipole antenna module.

FIGS. 21-23 illustrate another structure 100 that can be used as monostatic antenna module 11. Antenna structure 100 is a slot-fed magneto-electrical dipole that, in the current embodiment, is fabricated in laminate technology. It allows for transmission and reception of linearly polarized waves that are mutually orthogonal. It has a crossed-slot structure consisting of two perpendicular slots 102 and 103. One such slot is the port for the transmitter, the other for the receiver. Waveguides 104 and 105 are disposed in layers beneath the radiative elements 110 (consisting of individual radiative elements 106-109). Like the circularly shaped patch antenna 66, this antenna structure 100, including the crossed-slot (102 and 103), provides Type 1 symmetry with two planes of symmetry. Therefore, it provides both Crosstalk Cancellation Types I and II simultaneously under the condition that the signal at the transmitter port is perfectly balanced and that the signal at the receiver port is processed perfectly balanced by the receiver.

In layers below the crossed slots 102 and 103, a structure consisting of waveguide cavities and waveguides 104 and 105 is placed with the purpose of transporting electromagnetic energy from the transmitter to the antenna, and from antenna to the receiver. It is noted that the waveguide structure need not be symmetrical with respect to the two symmetry planes, given that they are not part of the monostatic antenna structure. To address potential scattering from the reflective parts in the environment, (metamaterial) absorbers also can be used in this embodiment.

FIGS. 24 and 25 illustrate a relevant structure 120 of yet another embodiment of a monostatic antenna module 11. This embodiment is a 4-arm Archimedean spiral antenna 120 that can be used as monostatic antenna module 11 and, in the current embodiment, is fabricated in a laminate or PCB technology. Sub-ports 121 and 123, connecting to radiative element 126A&B, together form the differential port 33, e.g., for the transmitter. Sub-ports 122 and 124, connecting to radiative element 128A&B, then form the differential port 36 for the receiver. In FIG. 25, the combined radiative portion 130 consists of radiative elements 126A&B and 128A&B and the ground plane 129 around and below the spirals. This antenna structure 120 offers Type 2 symmetry: an axis of symmetry can be defined such that if the structure is rotated along this axis by 90 degrees the resulting structure is congruent to that before rotation. This monostatic antenna is meant for transmission and reception of circularly polarized waves (in order to obtain full rotational invariance). For both the transmit and receive antenna, the orientations of these circularly polarized waves are identical (i.e., both being right-hand circular (RHC) or both being left-hand circular (LHC) oriented).

The transmission lines between antenna 120 and the transceiver 15 preferably are implemented in similar way as for antenna 60. The spiral (comprising radiative elements 126A&B and 128A&B) is implemented in one layer only, making it less sensitive for laminate layer misalignment which might disturb the symmetry and, therefore, degrade the intrinsic isolation.

In alternate embodiments, the radiative element is a rectangular conductive patch or a stack of rectangular conductive patches, with the patch(es) having none, one or more openings in it/them and preferably providing Type 1 symmetry, with one or two planes of symmetry (e.g., with the ports included in these symmetries).

In yet alternate embodiments, the radiative element is a conductive patch or a stack of conductive patches of any shape, again preferably providing Type 1 symmetry, with one or two planes of symmetry (e.g., with the ports included in these symmetries).

In yet alternate embodiments, the radiative elements consist of conductive straight or rod-shaped conductors mounted above a conductive body or ground, in this way forming monopoles, the wires having an angle with the ground that could be different then 90 degrees, e.g., with the whole structure providing Type 1 symmetry, with one or two planes of symmetry (e.g., with the ports included in these symmetries).

In yet alternate embodiments, the radiative elements consist of loops of straight or rod-shaped conductors mounted above a conductive body or ground, with each loop having any shape that preferably provides Type 1 symmetry, with one or two planes of symmetry (e.g., with the ports included in these symmetries).

In yet alternate embodiments, the radiative elements consist of openings or apertures in a conductive body, each aperture having any shape that preferably provides Type 1 symmetry, with one or two planes of symmetry (e.g., with the ports included in these symmetries).

In yet alternate embodiments, the antenna module consists of a combination or array of the above-mentioned antenna structures, e.g., with the resulting combined structure providing Type 1 symmetry, with one or two planes of symmetry (e.g., with the ports included in these symmetries).

System Environment.

Generally speaking, each of devices 10 and 20 can be any type of programmable general-purpose computing device (e.g., any of the electronic devices mentioned herein). Such a device typically will include, for example, at least some of the following components coupled to each other, e.g., via a common bus: (1) one or more central processing units (CPUs); (2) read-only memory (ROM); (3) random access memory (RAM); (4) other integrated and/or attached data storage devices; (5) input/output software and circuitry for interfacing with other devices (e.g., using a hardwired connection, such as a serial port, a parallel port, a USB connection or a FireWire connection, or using a wireless protocol, such as radio-frequency identification (RFID), any other near-field communication (NFC) protocol, Bluetooth or a 802.11 protocol); (6) software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system, which networks, in turn, in many embodiments of the invention, connect to the Internet or to any other networks; (7) a display (such as a liquid crystal display, an organic light-emitting display, a polymeric light-emitting display or any other thin-film display); (8) other output devices (such as one or more speakers, a headphone set); (9) one or more input devices (such as a mouse, one or more physical switches or variable controls, a touchpad, tablet, touch-sensitive display or other pointing device, a keyboard, a keypad, a microphone and/or a camera or scanner); (10) a mass storage unit (such as a hard disk drive, a solid-state drive, or any other type of internal storage device); (11) a real-time clock; and/or (12) a removable storage read/write device (such as a flash drive, a memory card, any other portable drive that utilizes semiconductor memory, a magnetic disk, a magnetic tape, an opto-magnetic disk, an optical disk, or the like). In operation, the process steps to implement any of the above methods and/or functionality discussed above, to the extent performed by such a general-purpose computing device, typically initially are stored in a bulk data storage device (e.g., a hard disk or solid-state drive), are downloaded into RAM, and then are executed by the CPU out of RAM. However, in some cases the process steps initially are stored in RAM or ROM and/or are directly executed out of mass storage.

Suitable general-purpose programmable devices can include, e.g., personal (e.g., desktop, laptop or tablet) computers and/or smaller computers, such as wireless telephones (e.g., smartphones) or any other programmable appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented by a general-purpose processor executing software and/or firmware, by dedicated (e.g., logic-based) hardware, or any combination of these approaches, with the particular implementation being selected based on known engineering tradeoffs.

In addition, where the present disclosure refers to a processor, computer, server, server device, computer-readable medium or other storage device, client device, or any other kind of apparatus or device, such references should be understood as encompassing the use of plural such processors, computers, servers, server devices, computer-readable media or other storage devices, client devices, or any other such apparatuses or devices, except to the extent clearly indicated otherwise.

Additional Considerations.

Some of the discussion above refers to the theoretical or mathematical ideal, such as referring to signals or processing being perfectly balanced. In real-world embodiments, such references are replaced with references to reaching those ideals within engineering tolerances and/or subject to other engineering trade-offs (e.g., by eliminating the word "perfectly" in the foregoing specific example).

As used herein, the term "coupled", or any other form of the word, is intended to mean either directly connected or connected through one or more other components, elements or processing blocks, e.g., for the purpose of preprocessing. In the drawings and/or the discussions of them, where individual steps, components, modules or processing blocks are shown and/or discussed as being directly connected to each other, such connections should be understood as couplings, which may include additional components, modules, elements and/or processing blocks. Unless otherwise expressly and specifically stated otherwise herein to the contrary, references to a signal herein mean any processed or unprocessed version of the signal. That is, specific processing steps discussed and/or claimed herein are not intended to be exclusive; rather, intermediate processing may be performed between any two processing steps expressly discussed or claimed herein, except to the extent expressly stated otherwise.

As used herein, the term "attached", or any other form of the word, without further modification, is intended to mean directly attached, attached through one or more other intermediate elements or components, or integrally formed together. In the drawings and/or the discussion, where two individual components or elements are shown and/or discussed as being directly attached to each other, such attachments should be understood as being merely exemplary, and in alternate embodiments the attachment instead may include additional components or elements between such two components. Similarly, method steps discussed and/or claimed herein are not intended to be exclusive; rather, intermediate steps may be performed between any two steps expressly discussed or claimed herein.

Whenever a specific value is mentioned herein, such a reference is intended to include that specific value or substantially or approximately that value. In this regard, the foregoing use of the word "substantially" is intended to encompass values that are not substantially different from the stated value, i.e., permitting deviations that would not have substantial impact within the identified context. For example, stating that a continuously variable signal level is set to a particular value should be understood to include values within a range around such specifically stated value that produce substantially the same effect as the specifically stated value. For example, the identification of a single length, width, depth, thickness, etc. should be understood to include values within a range around such specifically stated value that produce substantially the same effect as the specifically stated value. As used herein, except to the extent expressly and specifically stated otherwise, the term "approximately" can mean, e.g.: within ±10% of the stated value or within ±20% of the stated value.

In the preceding discussion, the terms "operators", "operations", "functions" and similar terms refer to method or process steps or to hardware components, depending upon the particular implementation/embodiment.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multipart criterion or condition).

In the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

As used herein, the words "include", "includes", "including", and all other forms of the word should not be understood as limiting, but rather any specific items following such words should be understood as being merely exemplary.

Several different embodiments of the present invention are described above and/or in any documents incorporated by reference herein, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the intent and the scope of the invention. Accordingly, the invention is not limited to the precise embodiments shown in the drawings and described above. Rather, it is intended that all such variations not departing from the intent of the invention are to be considered as within the scope thereof, as limited solely by the claims appended hereto.

What is claimed is:

1. A wireless communication antenna module, comprising:

a first radiative element, configured to be coupled to a transceiver to broadcast a transmission signal to another device over a band of frequencies, and a second radiative element, also configured to be coupled to the transceiver and receive a reception signal from the another device over the band of frequencies, and provide the reception signal to the transceiver, wherein the first radiative element and the second radiative element have a common centroid which is equivalent to a common geometric center;

wherein the first radiative element and the second radiative element together form a structure;

wherein the structure has a plane of symmetry where a mirror image of the structure with respect to the plane of symmetry is congruent to the structure; and wherein said structure includes a set of ports each having a first end coupled to the first radiative element or the second radiative element and a second end configured to be coupled to a waveguide between the wireless communication antenna module and the transceiver.

2. The wireless communication antenna module of claim 1, wherein the band of frequencies is at least 2 GHz wide.

3. The wireless communication antenna module of claim 1:

wherein the structure of said wireless communication antenna module has a Type 1 symmetry.

4. The wireless communication antenna module of claim 3, wherein there exists a second plane of symmetry such that said structure also is congruent to a second mirror image of said structure that results when the structure is mirrored with respect to said second plane.

5. The wireless communication antenna module of claim 1:

wherein at least one electromagnetic radiation absorber is disposed at least one of around or behind the wireless communication antenna module.

6. The wireless communication antenna module of claim 1, wherein the transmission signal is provided at a power not greater than 20 decibel-milliwatts (dBm).

7. The wireless communication antenna module of claim 1, wherein said first radiative element includes a first part and a second part, connected to a first waveguide and a second waveguide via a first sub-port and a second sub-port, and wherein said second radiative element also includes a third part and a fourth part, connected to a third waveguide and a fourth waveguide via a third sub-port and a fourth sub-port.

8. The wireless communication antenna module of claim 7, wherein the first part and the second part of the first radiative element and the third part and the fourth part of the second radiative element spiral out from a common center point.

9. The wireless communication antenna module of claim 1, wherein the first radiative element and the second radiative element are integrated into a single circular patch configured for transmission and reception of orthogonal linearly polarized waves.

10. The wireless communication antenna module of claim 1, further comprises an electromagnetic radiation absorber configured to be disposed between the wireless communication antenna module and other portions of a wireless communication device.

11. The wireless communication antenna module of claim 1, wherein the wireless communication antenna module is within a battery-powered handheld device.

12. The wireless communication antenna module of claim 1, wherein the wireless communication antenna module is within a mains powered device.

13. The wireless communication antenna module of claim 1:

wherein the first radiative element and the second radiative element together form a structure;

wherein the structure has an axis of symmetry where a rotated version of the structure about the axis of symmetry is congruent to the structure before rotation.

14. The wireless communication antenna module of claim 13:

wherein the structure of said wireless communication antenna module has a Type 2 symmetry.

15. The wireless communication antenna module of claim 13:

wherein the rotation is 180/n degrees where "n" is an integer greater than 1.

16. The wireless communication antenna module of claim 13:

wherein the structure includes a set of ports each having a first end coupled to the first radiative element or the second radiative element and a second end configured to be coupled to a waveguide between the wireless communication antenna module and the transceiver.

17. The wireless communication antenna module of claim 16:

wherein each of the ports are configured to generate a magnetic (H) field and an electric (E) field in response to the transmission signal or the reception signal; and wherein the ports H and E fields after the ports are physically rotated about the axis of symmetry by a predetermined degree and the ports H and E fields are phase shifted by the predetermined degree, are identical to the ports H and E fields before being physically rotated and the ports H and E fields being phase shifted by the predetermined degree.

18. The wireless communication antenna module of claim 1:

wherein each of the ports are configured to generate a magnetic (H) field and an electric (E) field in response to the transmission signal or the reception signal;

wherein a first one of the ports is configured to carry either the transmission or reception signal, and a second one of the ports is configured to be terminated; and wherein the ports H and E fields are symmetrical or anti-symmetrical with respect to the plane of symmetry.

19. A wireless communication system comprising:

a transceiver configured to modulate desired transmission data onto a band of frequencies, thereby generating a transmission signal, and to demodulate a reception signal within the band of frequencies in order to obtain received data; and an antenna module that includes a first radiative element, coupled to the transceiver and configured to receive and broadcast the transmission signal, and a second radiative element, also coupled to the transceiver and configured to receive the reception signal, simultaneous with said broadcast of the transmission signal, from a source and provide said reception signal to the transceiver, wherein the first radiative element and the second radiative element have a common centroid which is equivalent to a common geometric center, wherein the transceiver and the antenna module are part of a single wireless device that is configured for full-duplex wireless communication, at a data rate of at least 100 megabits per second (Mb/s) over a distance that is not more than a maximum specified distance from the antenna module, and wherein the maximum specified distance is not more than 100 millimeters (mm).

20. A wireless communication antenna module, comprising:

a first radiative element, configured to be coupled to a transceiver to broadcast a transmission signal to another device over a band of frequencies, and a second radiative element, also configured to be coupled to the transceiver and receive a reception signal from the another device over the band of frequencies, and provide the reception signal to the transceiver, wherein the first radiative element and the second radiative element have a common centroid which is equivalent to a common geometric center;

wherein said first radiative element includes a first part and a second part, connected to a first waveguide and a second waveguide via a first sub-port and a second sub-port; and wherein said second radiative element also includes a third part and a fourth part, connected to a third waveguide and a fourth waveguide via a third sub-port and a fourth sub-port.

* * * * *